UNITED STATES PATENT OFFICE.

AUGUSTUS BISCHLER, OF BASEL, SWITZERLAND, ASSIGNOR TO THE FIRM OF BASLE CHEMICAL WORKS, OF BASEL, SWITZERLAND.

PROCESS OF MAKING INDOXYL, &c.

No. 839,099.     Specification of Letters Patent.     Patented Dec. 25, 1906.

Application filed September 1, 1904. Serial No. 223,013.

*To all whom it may concern:*

Be it known that I, AUGUSTUS BISCHLER, doctor of philosophy and chemist, a subject of the Emperor of Russia, and a resident of Basel, Switzerland, have invented new and useful Improvements in the Manufacture of Indoxyl, Its Homologues, and Their Derivatives, of which the following is a clear and complete specification.

By melting the phenylglycin salts with alkalies, according to the method of Heumann, only little indoxyl, and therefore indigo, is obtained. The formation of indoxyl takes place in a considerably smoother manner if sodium amid or sodium oxid is added to the mixture of phenylglycin salt and alkali. An addition of alkali metals, such as sodium, to the melt will also improve the yield of indoxyl. There is, however, a great disadvantage about the latter proceeding. If only small proportions of sodium are added to the melt of phenylglycin and alkali, the yield of indoxyl is practically little better than that obtained according to the process of Heumann. By operating with larger proportions of sodium more indoxyl is formed, but the sodium in that case acts toward decomposition, so that finally an impure indigo is obtained, containing, for instance, only seventy per cent. of indigo.

By the present invention a very good yield of indoxyl, and therefore of indigo, is obtained by reacting with alcohol in the form of vapor on the mixture of alkali, sodium, and phenylglycin or its salts heated up to the formation of indoxyl. The presence of alcohol prevents decomposition and considerably increases the yield of indoxyl.

To illustrate the invention, the following example may be given: Fifteen parts of sodium and forty parts of the potassium salt of phenylglycin are added, while stirring well, to one hundred and forty parts of anhydrous caustic alkali (as potassium hydroxid, for example) heated to about 250° centigrade. Thereupon ten parts of absolute alcohol in the form of vapor are introduced by means of a current of hydrogen. The heating is continued until the formation of indoxyl does not increase any longer. The mass is dissolved in water and worked up to indigo in the usual way. For the phenylglycin or its salt may be substituted other arylglycins or derivatives of arylglycins or their salts, whereby the corresponding indoxyl derivatives are formed. Thus, for example, from the arylglycin anilids the arylglycin-arylglycids, also from the $\alpha$-arylhydantoins, the corresponding indigo-leuco derivatives may be obtained in very good yields, according to the above process.

In the described process the alcohol will react with the sodium and the caustic potash, (potassium hydroxid,) producing a mixture of sodium and potassium alcoholates, which mixture will at once in the state of formation act in a condensating manner on the arylglycin salt, at the same time regenerating the alcohol. This intermediately-formed variable mixture of alcoholates is different from the particular mixture of alcoholates of always the same constant composition which is formed according to my United States Patent No. 761,440, where in a solution of caustic potash and alcohol an equivalent quantity of sodium is dissolved, the excess of alcohol being subsequently distilled off *in vacuo*. The above procedure also differs from that described in United States Patent No. 737,836, according to which the phenylglycin salt is condensed in the presence of a caustic alkali with sodium or potassium alcoholate, for the reason that by the process of said United States Patent No. 737,836 no variable mixtures of alcoholates can be formed, but only a uniform alcoholate.

What I claim is—

1. The herein-described process for the manufacture of indoxyl, its homologues and their derivatives by reacting with alcohol in the form of vapor on mixtures of alkali, sodium and alkali salts of the arylglycins and of their derivatives, previously heated up to the formation of indoxyl, and by continuing afterward to heat until the formation of the indigo-leuco products is completed.

2. The herein-described process for the manufacture of indoxyl, its homologues and their derivatives by reacting with alcohol in the form of vapor on mixtures of potassium hydroxid, sodium and alkali salts of the arylglycins and of their derivatives, previously heated up to the formation of indoxyl, and by continuing afterward to heat until the formation of the indigo-leuco products is completed.

In witness whereof I have hereunto signed my name, this 20th day of August, 1904, in the presence of two subscribing witnesses.

AUGUSTUS BISCHLER.

Witnesses:
GEO. GIFFORD,
AMAND RITTER.